UNITED STATES PATENT OFFICE.

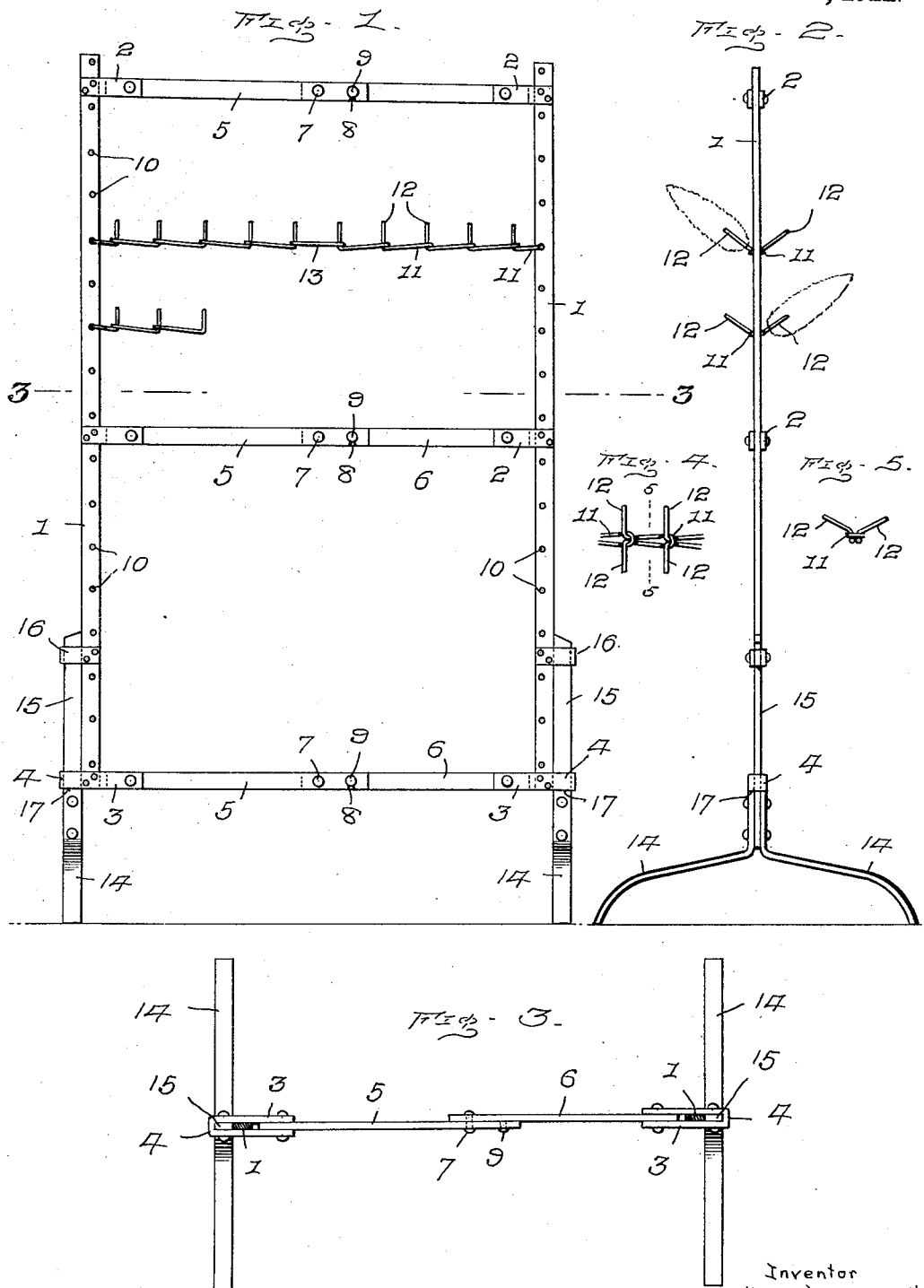

CLYDE R. MARSHALL, OF CEDAR RAPIDS, IOWA.

CORN RACK.

1,409,228.

Specification of Letters Patent. Patented Mar. 14, 1922.

Application filed September 30, 1920. Serial No. 413,817.

*To all whom it may concern:*

Be it known that I, CLYDE R. MARSHALL, a citizen of the United States, residing at Cedar Rapids, in the county of Linn and State of Iowa, have invented certain new and useful Improvements in Corn Racks; and I do hereby declare the following to be a full, clear, and exact description of the invention, such as will enable others skilled in the art to which it appertains to make and use the same.

This invention relates to a new and useful seed corn rack and the primary object of the invention is to provide a rack of this character which will accommodate and individually support a great many ears of corn in spaced relation to each other so that they will all dry uniformly.

Another object of the invention is to provide novel supporting means for the ears of corn whereby a maximum number of ears can be supported in a minimum amount of space.

A further object of the invention is to provide a corn rack of the above stated character which can be readily and quickly collapsed into a compact bundle for the purpose of storage or transportation.

A still further object of the invention is to provide the rack with removable supporting legs.

With these and other objects in view which will appear as the description proceeds, the invention comprises the various novel features of construction, combination and arrangement of parts as will be fully described hereinafter and afterwards specifically claimed.

Referring to the drawings:—

Figure 1 represents a side elevation of the seed corn rack;

Figure 2 represents an end view thereof;

Figure 3 represents a sectional plan view taken on a plane indicated by the line 3—3 on Figure 1;

Figure 4 represents a fragmentary plan view of the corn supporting means, and

Figure 5 represents a transverse sectional view taken on a plane indicated by the line 5—5 on Figure 4.

In order that the construction and operation of the invention may be readily comprehended by those skilled in the art to which the invention relates, I have illustrated an approved embodiment thereof in the accompanying drawings, and will now proceed to fully describe the same in connection with said drawings in which 1 are the vertical side bars which are each provided at the top and intermediate portion with a pair of spaced inwardly projecting ears 2, which can either be made integral therewith or detachably connected by bolts, rivets, or the like. The bottom end of each side bar is provided with a horizontally disposed loop 3 rigidly or detachably connected thereto at a point intermediate its ends so as to form a socket 4.

Arms 5 and 6 have their outer ends pivotally connected in the loops 3 and between the spaced ears 2, and their inner ends pivotally connected in overlapping relation as indicated by the numeral 7. Each inner end of the arms 5 is provided with a notch 8 adapted to receive a laterally projecting headed stud 9 carried by the adjacent arm 6, said connecting parts cooperating with the adjacent pivot 7 to hold the arms 5 and 6 in longitudinal alinement with each other.

The side bars are each further provided with a vertical row of apertures 10 to which are connected the ends of a plurality of horizontal rows of chains. Each of these chains is of special construction and comprises a series of interlooped links as clearly shown in Figure 4. Each link is formed from a single strand of wire folded medially upon itself to form a horizontally disposed loop 11, the terminal ends of which are extended through the loop 11 of the adjacent link and then in opposite directions at right angles to and in upwardly inclined relation to the loop to form ear supporting prongs 12. The ears of corn are adapted to be positioned on the prongs by forcing the latter into the pith or the central portion of the corn cob.

It is to be further noted that each chain is composed of two sections, the links of one being arranged oppositely to those of the other so that the end links of the two sections can be conveniently looped through the apertures 10 in the side bars. The inner ends of the two chain sections terminate in spaced relation to each other and are connected by an elongated link 13 passing around beneath the adjacent prongs 12.

The rack is adapted to be supported by suitably shaped feet 14 carried by legs 15 which are adapted to be inserted through the loops 4 and loops 16 carried by the side bars until the loops 4 rest upon the shoulders 17 formed by the connection of the feet with the legs.

From the foregoing it will be apparent that the legs can be readily detached and the rack frame folded together to occupy a minimum amount of space.

What I claim as new is:

1. A seed corn rack comprising a collapsible frame, chains disposed across said frame, ear supporting means carried by said chains, and means for supporting said frame.

2. A seed corn rack comprising a foldable frame, ear supporting means carried by said frame, loops projecting laterally from said frame, and supporting legs removably positioned within said loops.

3. A seed corn rack comprising a pair of parallel side bars, arms pivotally connected together and to said side bars, a plurality of chains connecting said side bars, and a plurality of individual ear supporting means carried by each of said chains.

4. A seed corn rack comprising a pair of parallel side bars, arms pivotally connected together and to said side bars, means to hold said arms in horizontal alinement, spaced rows of chains extending across said rack and connected to the side bars, and a plurality of individual ear supporting means carried by each chain.

5. A seed corn rack comprising a frame, means for supporting the frame, rows of chains arranged horizontally of said frame, and a plurality of ear supporting prongs projecting in opposite directions from said chains.

6. In a seed corn rack comprising a frame, means for supporting said frame, rows of chains arranged across said frame, each chain embodying a series of interlooped links, and said links each terminating in oppositely disposed ear supporting prongs.

7. A seed corn rack comprising a collapsible frame including a chain having links provided with outstanding ear supporting prongs.

8. A seed corn rack including a chain having a series of interlooped links, said links of the series each terminating in oppositely disposed ear supporting prongs.

In testimony whereof I have signed my name to this specification in the presence of two subscribing witnesses.

CLYDE R. MARSHALL.

Witnesses:
W. L. GLESSNER,
G. E. KEMPER.